United States Patent Office 3,456,030
Patented July 15, 1969

3,456,030
PROCESS FOR DEHYDROGENATION OF OLEFINS
Grant Crane and Edward L. Kay, Akron, Ohio, assignors to The Firestone Tire & Rubber Company, Akron, Ohio, a corporation of Ohio
No Drawing. Filed Feb. 3, 1967, Ser. No. 613,760
Int. Cl. C07c 11/12, 5/18; B01j 11/06
U.S. Cl. 260—680    7 Claims

ABSTRACT OF THE DISCLOSURE

A catalytic process for the oxidative dehydrogenation of mono-olefins to the corresponding diolefins employing a catalyst of mixed oxides of molybdenum, bismuth and cerium. The mono-olefin passes through a reaction zone containing the catalyst, at temperatures from 350° to 650° C., usually at about atmospheric pressure.

BACKGROUND OF THE INVENTION

This invention relates to a process for the production of conjugated diolefins. More particularly, it relates to the catalytic preparation of conjugated diolefins from mono-olefins by oxidative dehydrogenation.

It is known to employ oxidative dehydrogenation to produce conjugated diolefins from the corresponding mono-olefins.

U.S. Patent No. 2,991,320 discloses the use of mixed oxides of bismuth and molybdenum to catalyze the oxidative dehydrogenation of olefins to the corresponding diolefins. British Patent No. 965,200 discloses promoter catalysts of boron, manganese, or phosphorus oxides to improve the performance of the primary catalyst. These catalysts, often diluted with inert materials, are placed in contact with the mono-olefin feed stream at optimum temperature and pressure conditions. The effluent is collected, and the desired product is separated from unreacted feed materials, reaction by-products, and any inert diluent which may be present. The physical size and shape of the catalyst may vary, depending on the type of reaction chamber employed. Fluidized-bed reactors use a catalyst in powder form, while fixed-bed reactors use larger pellets or granules.

Catalysts of this type are prepared by combining salts of the desired metals in proportions so that their oxides will have the desired composition. The salts are precipitated with an inert material (usually silica or alumina) dried, and fired to produce the desired mixture of oxides.

In the manufacture of conjugated diolefins by these known processes, stress is placed on achieving both a high degree of conversion of the feed material and a high selectivity. Conversion is defined as that percentage of the incoming feed material which is chemically changed in the reaction zone. Obviously, this figure may be obtained by subtracting from 100% that percentage of the feed material which passes through the reaction zone unchanged or, in the case of an olefin, is isomerized only to the extent of shifting the position of the carbon-carbon double bond without changing the carbon skeleton and is recovered along with the reaction products and whatever inert material was used as a diluent. Selectivity is here defined as the mole percentage of desired diolefin formed based on the moles of mono-olefin reacted. Other considerations may also be important, such as, for instance, catalyst life, ease of regeneration, and numerous other conditions. The value and efficiency of the process, however, may be determined by the values of conversion and selectivity. Thus, a means of improving these two values is of prime importance to the manufacturer.

SUMMARY OF THE INVENTION

It is therefore an object of the instant invention to provide a process for the conversion of mono-olefins to the corresponding conjugated diolefins by means of an oxidative dehydrogenation reaction with improved conversion and selectivity.

According to this invention, the addition of cerium oxide to the known catalyst system of bismuth and molybdenum oxides gives substantial improvements in both conversion and selectivity in this oxidative dehydrogenation reaction. By including minor amounts of cerium oxide as a promoter catalyst, unexpected increases in the efficiency of the process are obtained.

DESCRIPTION OF THE PREFERRED EMBODIMENTS

Catalyst

The catalyst of the invention can be produced by combining the oxides of bismuth, molybdenum and cerium in any convenient manner to produce a homogeneous mixture. Conveniently, the component materials can be mixed in water solution, and the water evaporated off. The mixture can then be fired at an elevated temperature to convert any salts which may be present to the corresponding oxides. The temperature during the firing operation should be high enough to convert substantially all the salts present into oxides, but should not exceed 600° C., and should preferably stay below 550° C. The atomic ratio of bismuth to molybdenum should be at least ten atoms of bismuth to one hundred atoms of molybdenum, and is preferably from about 5 to 18 times this minimum. The atomic ratio of cerium to molybdenum can vary quite widely from 2.5 or fewer atoms of cerium up to 50 or more atoms of cerium per 100 atoms of molybdenum. In general, no benefit is noticed with the higher levels of cerium, and the amount used would probably be kept low, for cost reasons.

The catalyst can be used by itself, in "unsupported" form, but is usually combined with an inert material, such as silica or alumina for ease of handling. The amount of inert material used will rarely exceed about 50% by weight of the total. Where pellet form or large granules are desired, the catalyst mixture can be prepared for firing in its desired finished shape and size. When smaller particle size is required, the fired catalyst may be ground and sieved to obtain the desired size distribution.

Feed material

The feed material of the invention is a mono-olefin, or mixtures of mono-olefins, having from four to seven carbon atoms. These materials include, for example, butene-1, cis- or trans-butene-2, pentene-1, cis- or trans-pentene-2, 3 - methyl butene-1, 2 - methyl butene-2, 2-methyl butene-1, hexene-1, cis- or trans-hexene-2, and cyclohexene. The invention is directed principally to the manufacture of 1,3-butadiene and isoprene, but may also be used in producing the other conjugated diolefins derived from the mono-olefins referred to above.

Diluent

An inert gas can be included as a diluent in the process of the invention, in order to improve conversion by lowering the partial pressure of the desired product in the effluent mixture. The presence of a diluent also acts to reduce the concentration of oxygen in the mixture below the minimum required for combustion of the feed hydrocarbons. Such materials as nitrogen, argon, or carbon dioxide can be employed for this purpose, although they are not necessary for successful operations. The use of diluents presents a problem in the recovery step, as the separation of these inert materials can be difficult. Water vapor used as a diluent avoids this difficulty, by offering an inexpensive diluent which can be readily condensed out of the effluent stream at convenient temperatures and pressures. The amount of water vapor used is not at all critical and can range from none up to about twenty or more times the volume of the feed stock, although a preferred level is from three to ten times the volume of the mono-olefin feed stock.

Oxygen

In the oxidative dyhydrogenation reaction, one-half mole of oxygen reacts with each mole of olefin feed stock, producing the diolefin and one mole of water vapor. Thus the stoichiometric quantity of oxygen required is one-half mole per mole of olefin. Recommended amounts of oxygen are between about 0.3 and 2.0 moles per mole of olefin. About 1.0 mole oxygen per mole of olefin is preferred. The oxygen may be supplied as substantially pure oxygen, or as air. The use of air necessarily introduces a significant quantity of inert gas, primarily nitrogen, which increases the problem of non-condensable gases in the effluent. The cost savings in using air is compensating relative to the use of pure oxygen.

Temperature

The reaction of the invention will proceed appreciably at temperatures as low as 350° C., and may be accomplished at temperatures as high as about 650° C. or above. Higher temperatures, as may be expected, give higher conversion rates, but selectivities tend to decrease somewhat as the reaction temperature increases. The preferred temperature range is from about 400° C. to about 550° C.

Pressure

The reaction will proceed at atmospheric pressure, and is generally run at pressures ranging from one-half to five atmospheres. Higher pressures may be employed, however, if desired, up to twenty atmospheres or more.

Reaction rates

Rates of reaction will be characterized by the feed rate of the mono-olefinic hydrocarbon. This rate is expressed as the gaseous hourly space velocity, abbreviated as GHSV. The GHSV is defined as volumes of reactant gas (calculated at standard conditions, 0° C. and 760 mm.) passed per hour per unit volume of the cataylst bed. GHSV values of from 30 to about 1,000 can be used to advantage. High throughput rates would naturally present an economic advantage. Since the reaction is exothermic, problems can arise in removing heat from the reaction zone. Preferred olefin GHSV values for the reaction of this invention are from about 80 to about 350.

EXAMPLE 1

A catalyst was prepared by first combining the following ingredients in solution:

| Material | Control (Mo+Bi) | Test catalyst (Mo+Bi+Ce) |
|---|---|---|
| 85% $MoO_3$ (g.) | 5.9 | 5.9 |
| $Bi(NO_3)_3.5H_2O$ (g.) | 12.0 | 12.0 |
| $Ce(NO_3)_3.6H_2O$ | | 0.43 |
| $HNO_3$ (70%) (ml.) | 1 | 1 |
| $H_2O$ (distilled) (ml.) | 8 | 8 |
| $SiO_2$ Sol (30%) (g.) | 16.7 | 16.7 |

The precipitates that formed on mixing the above ingredients were evaporated to dryness and were then fired for 16 hours at an average temperature of 540° C. The catalysts were then ground to a particle size of from 10 to 20 mesh.

The above combinations are calculated to yield catalysts having atomic ratios (Mo:Bi:Ce) of 100:71.5:0 for the control and 100:71.5:2.87 for the test catalyst.

EXAMPLE 2

Using the catalysts prepared in Example 1 above, dehydrogenation of 1-butene was accomplished, as follows: A mixture of 1-butene, air and steam was passed through a reaction zone containing the catalysts of Example 1 in a particle size of 10 to 20 mesh. Five volumes of air and from eight to ten volumes of steam were mixed with each volume of hydrocarbon feed. The feed mixture passed through a pre-heat section, through the reaction zone, and into the recovery area, where the product composition was analyzed by gas chromatography. The following measurements were recorded:

| | Run | | | | | | | |
|---|---|---|---|---|---|---|---|---|
| | A | | B | | C | | D | |
| Catalyst | Bi+Mo | | Bi+Mo | | Bi+Mo+Ce | | Bi+Mo+Ce | |
| Temp., ° C | 464 | 479 | 472 | 480 | 473 | 473 | 464 | 471 |
| GHSV | 109 | 109 | 116 | 116 | 87 | 87 | 123 | 123 |
| Percent conversion | 79.0 | 81.6 | 86.2 | 84.2 | 84.1 | 86.2 | 91.3 | 88.1 |
| Percent selectivity | 80.8 | 86.1 | 79.3 | 81.8 | 85.4 | 84.7 | 83.3 | 86.2 |
| Percent butadiene yield | 63.7 | 70.2 | 68.5 | 68.8 | 71.8 | 73.2 | 77.1 | 76.0 |
| Percent $CO_2$ | 8.5 | 7.8 | 13.0 | 10.6 | 10.0 | 8.8 | 10.1 | 8.2 |
| Percent CO | 6.5 | 3.3 | 4.6 | 4.6 | 0.9 | 2.7 | 3.0 | 3.0 |
| Percent coke | 0.25 | 0.26 | 0.17 | 0.93 | 0.93 | 0.91 | 0.91 | 0.91 |

EXAMPLE 3

In a similar manner, the cerium-containing catalyst of Example 1 was used in the production of isoprene from different isomers of isoamylene. Again five volumes of air and from eight to ten volumes of steam per volume of hydrocarbon feed were used. The results for three different isomers are listed:

| | Run | | |
|---|---|---|---|
| | E | F | G |
| | Catalyst | | |
| | Bi+Mo+Ce | Bi+Mo+Ce | Bi+Mo+Ce |
| Feed | 3-methyl-1-butene | 2-methyl-1-butene | 2-methyl-2-butene |
| Temp. °C | 446 | 457 | 453 |
| GHSV | 125 | 142 | 147 |
| Percent conversion | 52.6 | 59.3 | 53.0 |
| Percent selectivity | 56.3 | 56.7 | 59.6 |
| Percent isoprene yield | 29.8 | 33.7 | 31.6 |
| Percent $CO_2$ | 17.4 | 20.6 | 16.4 |
| Percent CO | 3.8 | 3.7 | 4.1 |
| Percent coke | 0.68 | 0.53 | 1.05 |

EXAMPLE 4

The cerium-containing catalyst of Example 1 was used in the production of butadiene from a feed containing mixed isomers of n-butene. As before, about five volumes of air were mixed with one volume of the mixed monoolefin feed, and about nine volumes of steam were added as a diluent. The following results were obtained:

| Run | H | I | J | K |
|---|---|---|---|---|
| Feed mixture: | | | | |
| Percent 1-butene | 1.1 | 51.8 | 35.0 | 35.7 |
| Percent t-2-butene | 51.8 | 26.2 | 35.0 | 34.5 |
| Percent c-2-butene | 43.9 | 20.7 | 28.1 | 27.8 |
| Percent n-butane | 3.0 | 1.2 | 1.7 | |
| Temp., °C | 510 | 505 | 512 | 510 |
| GHSV | 156 | 153 | 146 | 149 |
| Percent conversion | 78.0 | 80.0 | 85.0 | 84.0 |
| Percent selectivity | 76.3 | 80.9 | 78.9 | 82.2 |
| Percent butadiene yield | 59.7 | 65.0 | 67.0 | 69.0 |
| Percent $CO_2$ | 12.1 | 10.2 | 12.7 | 9.5 |
| Percent CO | 5.5 | 4.5 | 4.2 | 4.6 |
| Percent coke | 0.17 | 0.18 | 0.5 | 0.06 |

We claim:

1. A process for conversion of a mono-olefinic compound having from 4 to 7 carbon atoms to the corresponding conjugated diolefin by contacting a mixture of said mono-olefinic compound and oxygen with a catalyst comprised of a mixture of oxides of bismuth and molybdenum having a bismuth to molybdenum atomic ratio of at least 0.1 and minor amounts of cerium oxide as a promoter at a temperature of from 350° C. to 650° C.

2. The process of claim 1 in which the molar ratio of oxygen to said mono-olefinic compound is from about 0.3:1 to about 2:1.

3. The process of claim 1 in which said mono-olefinic compound is a normal butene.

4. The process of claim 1 in which said mono-olefinic compound is a pentene.

5. The process of claim 1 in which steam is added as a diluent to the mixture of said mono-olefinic compound and oxygen.

6. The process of claim 1 in which said mono-olefinic compound is comprised of mixed n-butenes.

7. The process of claim 2 in which said mono-olefinic compound is 1-butene, the oxygen is in the form of atmospheric air, the atomic ratio of molybdenum to bismuth to cerium is 100 to 71.5 to 2.87, and steam is added as a diluent to the mixture of said mono-olefinic compound and oxygen.

References Cited
UNITED STATES PATENTS

| | | |
|---|---|---|
| 2,991,320 | 7/1961 | Hearne et al. |
| 3,251,900 | 5/1966 | Callahan et al. |
| 3,320,330 | 5/1967 | Callahan et al. |

PAUL M. COUGHLAN, Primary Examiner

U.S. Cl. X.R.

252—462; 260—666